United States Patent
Bourhis et al.

(10) Patent No.: US 11,407,522 B2
(45) Date of Patent: Aug. 9, 2022

(54) AIR INLET, NACELLE, PROPULSIVE ASSEMBLY AND AIRCRAFT WITH GROOVED LIP

(71) Applicant: Airbus Operations SAS, Toulouse (FR)

(72) Inventors: Arnaud Bourhis, Toulouse (FR); Gregory Albet, Toulouse (FR); François Pons, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 17/017,482

(22) Filed: Sep. 10, 2020

(65) Prior Publication Data
US 2021/0078718 A1    Mar. 18, 2021

(30) Foreign Application Priority Data
Sep. 12, 2019 (FR) ...................................... 1910046

(51) Int. Cl.
*B64D 33/02*    (2006.01)
*B64D 15/04*    (2006.01)
(Continued)

(52) U.S. Cl.
CPC ............. *B64D 33/02* (2013.01); *B64D 15/04* (2013.01); *F02C 7/045* (2013.01); *F02C 7/047* (2013.01);
(Continued)

(58) Field of Classification Search
CPC . F02C 7/045; F02C 7/047; F02C 7/04; B64D 15/04; B64D 33/02;
(Continued)

(56) References Cited

U.S. PATENT DOCUMENTS 7,938,224 B2 *   5/2011   Frustie ..................... F02C 7/047
                                                    181/214
8,413,922 B2 *   4/2013   Porte ....................... B64D 33/02
                                                    244/1 N
(Continued)

FOREIGN PATENT DOCUMENTS

EP    2578496 A2    4/2013
FR    2917067 A1   12/2008
(Continued)

OTHER PUBLICATIONS

French Search Report; priority document.

*Primary Examiner* — Alain Chau
(74) *Attorney, Agent, or Firm* — Greer, Burns & Crain, Ltd.

(57) ABSTRACT

An air inlet for an aircraft nacelle, including a lip and a front frame, which together form a duct with D-shaped section receiving hot air. The front frame is arranged in an advanced position inside the lip. The lip has de-icing grooves, which communicate with the duct and extend essentially downstream of the front frame. Downstream of the front frame, outside of the de-icing grooves, the lip has perforated zones provided with sound absorption holes. The air inlet includes a foil, which hermetically seals the de-icing grooves and is provided with sound absorption holes facing the perforated zones. The air inlet comprises acoustic panels inside the lip downstream of the front frame. The advanced position of the front frame, due to the de-icing grooves which ensure the de-icing of the lip downstream of the front frame, allows the acoustic treatment surface of the air inlet to be increased.

15 Claims, 4 Drawing Sheets

(51) Int. Cl.
*F02C 7/045* (2006.01)
*F02C 7/047* (2006.01)

(52) U.S. Cl.
CPC ........... *B64D 2033/0206* (2013.01); *B64D 2033/0233* (2013.01); *B64D 2033/0286* (2013.01); *F05D 2220/323* (2013.01); *F05D 2260/96* (2013.01)

(58) Field of Classification Search
CPC .... B64D 2033/0206; B64D 2033/0233; B64D 2033/0286; B64D 15/00
See application file for complete search history.

(56) References Cited

U.S. PATENT DOCUMENTS

| | | | | |
|---|---|---|---|---|
| 8,448,901 | B2 * | 5/2013 | Porte | B64D 15/04 244/134 B |
| 8,584,363 | B2 * | 11/2013 | Caruel | F02C 7/045 29/897.2 |
| 8,602,360 | B2 * | 12/2013 | Porte | B64D 33/02 244/134 B |
| 8,931,252 | B2 * | 1/2015 | Richardson | F02C 7/04 60/39.093 |
| 8,991,054 | B2 * | 3/2015 | Porte | G10K 11/168 29/505 |
| 9,010,084 | B2 * | 4/2015 | Chelin | B64D 15/04 244/54 |
| 9,353,648 | B2 * | 5/2016 | Porte | F01D 25/24 |
| 9,388,767 | B2 * | 7/2016 | Porte | B64D 15/04 |
| 9,719,422 | B2 * | 8/2017 | Porte | F02C 7/045 |
| 10,273,015 | B2 * | 4/2019 | Surply | B64D 33/02 |
| 10,532,820 | B2 * | 1/2020 | Caruel | B64D 33/02 |
| 2006/0219475 | A1 * | 10/2006 | Olsen | F01D 25/32 181/214 |
| 2010/0096213 | A1 * | 4/2010 | Frustie | B64D 33/02 181/214 |
| 2010/0181420 | A1 | 7/2010 | Porte et al. | |
| 2010/0252685 | A1 * | 10/2010 | Porte | B64D 15/04 244/134 B |
| 2010/0276548 | A1 * | 11/2010 | Porte | F02C 7/045 244/53 B |
| 2010/0314082 | A1 * | 12/2010 | Porte | B64D 33/02 165/157 |
| 2011/0155855 | A1 * | 6/2011 | Caruel | B64D 33/02 244/134 D |
| 2011/0162340 | A1 * | 7/2011 | Valleroy | B64D 33/02 156/298 |
| 2012/0048389 | A1 * | 3/2012 | Chelin | B64D 15/04 137/15.1 |
| 2012/0317782 | A1 | 12/2012 | Porte et al. | |
| 2012/0318029 | A1 * | 12/2012 | Porte | B21D 47/00 72/54 |
| 2013/0098471 | A1 * | 4/2013 | Porte | B64D 33/02 137/15.1 |
| 2013/0224000 | A1 | 8/2013 | Porte et al. | |
| 2013/0263601 | A1 * | 10/2013 | Richardson | F02C 3/32 60/722 |
| 2013/0266419 | A1 * | 10/2013 | Richardson | F02C 7/045 415/1 |
| 2014/0001284 | A1 * | 1/2014 | Porte | B64D 33/02 239/265.11 |
| 2015/0315972 | A1 * | 11/2015 | Lumbab | B32B 37/12 181/290 |
| 2016/0257418 | A1 * | 9/2016 | Caruel | B64D 15/04 |
| 2017/0096230 | A1 * | 4/2017 | Surply | F02C 7/045 |
| 2019/0118955 | A1 * | 4/2019 | Porte | B64D 33/02 |
| 2020/0276641 | A1 * | 9/2020 | Benard | B22F 3/225 |

FOREIGN PATENT DOCUMENTS

| | | |
|---|---|---|
| FR | 2976557 A1 | 12/2012 |
| FR | 3070674 A1 | 3/2019 |

* cited by examiner

AIR INLET, NACELLE, PROPULSIVE ASSEMBLY AND AIRCRAFT WITH GROOVED LIP

CROSS-REFERENCES TO RELATED APPLICATIONS

This application claims the benefit of the French patent application No. 1910046 filed on Sep. 12, 2019, the entire disclosures of which are incorporated herein by way of reference.

FIELD OF THE INVENTION

The invention relates to an air inlet of an aircraft nacelle. More specifically, the invention is centered on the lip of such an air inlet.

BACKGROUND OF THE INVENTION

Conventionally, an air inlet of an aircraft nacelle, such as illustrated in the attached FIG. 1, comprises structural elements including a front frame 101 and a rear frame 104 and, from front to rear of the nacelle, a lip 100 borne by the front frame, outer panels 102 extending the lip outside the nacelle, inner panels 103 extending the lip inside the nacelle and forming an internal surface delimiting an internal duct making it possible to channel the air towards the engine, the outer 102 and inner 103 panels being borne by the front frame 101 and the rear frame 104.

The lip 100 is usually composed of several aluminum sectors linked by clips.

Throughout the description, a panel or a lip sector is observed installed in an aircraft air inlet. The expressions "transverse direction" and "transversely" then refer to a direction which extends in a transverse plane of the air inlet, that is to say, which is orthogonal to the center axis of the air inlet (the center axis of the air inlet being parallel to the axis X of FIG. 1). The expression "longitudinally" refers to a direction which can be substantially parallel to the center axis of the air inlet if the air inlet can be considered locally as being cylindrical, or which can be a generatrix of the air inlet if the latter can be considered locally as being tapered. A "longitudinal plane" is a plane containing the center axis of the air inlet.

The form of the air inlet and/or the systems with which it is equipped must make it possible to avoid the formation and/or the accumulation of ice or frost, to limit the impact of sound nuisances, to ensure an aerodynamic function, and to prevent the penetration of birds into the fan compartment containing the engine systems.

The lip is dimensioned by taking into account thermal stresses (formation of frost/ice and consequence of the de-icing of its leading edge), and of the mechanical stresses that it is forced to undergo during the life of the airplane (bird impact, alternating hot/cold, etc.).

To attenuate sound nuisances, known inner panels 103 are generally composed of:

a resistive skin which forms the visible face of the inner duct of the air inlet downstream of the lip, and the purpose of which is to absorb the soundwaves; to this end, the resistive skin is pierced with a multitude of holes of a diameter generally lying between 0.8 mm and 1.6 mm; on known prior panels, these holes are formed over all the surface of the resistive skin;

a lining acoustic panel, which comprises (from inside to the outside of the air inlet, that is to say, in a centrifugal direction)

a honeycomb core pressed against the resistive skin, which core participates both in the mechanical strength of the panel and in the acoustic damping. The thickness of the core determines the damped acoustic frequency, a rear skin whose function is essentially to ensure the structural strength of the panel.

Moreover, the de-icing of the air inlet is ensured by the provision of longitudinal de-icing tubes 105 (see FIG. 1) bringing hot air from the engine to the duct with D-shaped section formed by the front frame 101 and the lip 100.

Thus, in known nacelles, the acoustic treatment and the de-icing are observed to be decoupled and independent. On one side, the de-icing hot air must be in contact with the lip to de-ice the latter; on another side, the hot air temperature necessary to obtain the de-icing of the leading edge of the lip is too high for the constituent material of known acoustic panels. The de-icing is therefore restricted to the duct with D-shaped section formed by the lip and the front frame (i.e., at best, 40% of the length of the air inlet), while the acoustic treatment is restricted to the surface of the inner duct of the air inlet which extends downstream of the front frame (i.e., at best, 60% of the length of the air inlet).

The invention aims to increase the acoustic treatment surface of an air inlet and potentially the surface that is de-iced.

SUMMARY OF THE INVENTION

To do this, the invention proposes an air inlet for an aircraft nacelle comprising a front frame and a lip, which together form a duct with D-shaped section receiving hot air. The air inlet according to the invention is characterized in that:

the front frame is arranged in an advanced position inside the lip (unlike prior lips in which the front frame is positioned at the edge of the lip, at the rear edge thereof);

the lip has grooves, called de-icing grooves, each de-icing groove communicating with the duct with D-shaped section, each de-icing groove having a downstream part extending downstream of the front frame (that is to say, behind the front frame in the direction of the central axis of the air inlet), downstream of the front frame and outside of the de-icing grooves, the lip has perforated zones provided with sound absorption holes, the air inlet comprises a foil, which covers and hermetically seals at least the downstream part of the de-icing grooves, the foil being provided with sound absorption holes facing the perforated zones of the lip and being solid facing the de-icing grooves, the air inlet comprises acoustic panels inside the lip downstream of the front frame at least facing the perforated zones. The lip therefore serves, in the perforated zones, as resistive skin for the acoustic panels.

Obviously, the air inlet can also comprise acoustic panels on the inner surface extending the lip to the rear, as in the air inlets of the state of the art.

The de-icing grooves participate in the de-icing function, and do so downstream of the front frame (whereas the de-icing is limited to the duct with D-shaped section and therefore stops at the front frame in known air inlets): the hot air sent into the duct with D-shaped section can then circulate in the de-icing grooves since the latter communicate with the duct with D-shaped section.

The perforated zones of the lip, that the acoustic waves can pass through, participate in the acoustic treatment, and do so, at the lip, that is to say, upstream of the inner surface (whereas the acoustic treatment is limited to the inner surface which extends the lip to the rear in known air inlets). These acoustic waves which pass through the perforated zones are then trapped by the acoustic panels provided on the perforated zones of the lip downstream of the front frame.

Thus, according to the invention, the acoustically treated surface extends beyond the inner surface, inside the lip. An acoustic treatment can thus be obtained over a desired length, possibly ranging up to 85% of the length of the air inlet (compared to 60% in the prior art).

The hot air circulating in the de-icing grooves downstream of the front frame does not penetrate into the acoustic panels (and therefore does not risk damaging them) since the de-icing grooves and the foil form hot air circulation channels which are hermetically sealed downstream of the front frame.

Furthermore, by virtue of the invention, the front frame is smaller because of its advanced position inside the lip (whereas, it is positioned at the downstream end of the lip in known air inlets). Being smaller, the front frame is also less heavy, such that the invention also has the advantage of reducing the weight of the air inlet. The advancing of the front frame and the reduction of the duct with D-shaped section do not cause the de-icing length to be reduced since the hot air sent into the duct with D-shaped section then circulates in the de-icing grooves of the lip downstream of the front frame. The de-iced length can even be greater than that of prior air inlets, depending on the length of the de-icing grooves.

The de-icing grooves extend preferably to the downstream end of the lip.

Preferably, each de-icing groove also has an upstream part extending upstream of the front frame (that is to say, in front of the front frame in the direction of the center axis of the air inlet), which upstream part communicates with the duct with D-shaped section. As a variant, the de-icing grooves extend only downstream of the front frame and link means are provided between each groove and the duct with D-shaped section or between each groove and a hot air source (situated for example more downstream, close to the engine).

According to one possible feature of the invention, the lip has other grooves, called acoustic grooves, which incorporate the perforated zones of the lip, the sound absorption holes being formed at the bottom of the acoustic grooves.

Preferably, the acoustic grooves extend only downstream of the front frame. It is worth noting that if they extend also upstream of the front frame, they must not communicate with the duct with D-shaped section.

The benefit of these acoustic grooves is that the sound absorption holes are formed in zones wherein the lip has a lesser thickness.

Indeed, it is known that the sound absorption holes must have a diameter greater than (or possibly equal to) the thickness of the perforated wall. At the same time, the larger the holes are, the more they generate aerodynamic disturbances (they influence, in particular, the drag). A smaller wall thickness in the perforated zones therefore makes it possible to provide smaller holes.

In a first possible version of the invention, the de-icing grooves are formed on the inner face of the lip and the foil extends only downstream of the front frame, between the inner face of the lip and the acoustic panels. Since the foil is defined both as covering at least the downstream part of the de-icing grooves (which means that the foil extends downstream of the front frame and goes at least, to the front, as far as the front frame, and does so for all the versions of the invention) and as extending only to the rear of the front frame (in this first embodiment version, which means that the foil "stops" at the front frame), the de-icing grooves communicate with the duct with D-shaped section since they are not covered upstream of the front frame.

In a preferred embodiment of this first version, the lip also comprises acoustic grooves as previously defined, and these acoustic grooves are formed also on the inner surface of the lip, alternating with the de-icing grooves.

In a second possible version of the invention:
the de-icing grooves are formed on the outer face of the lip,
the foil is arranged outside the lip so as to cover all of the de-icing grooves (that is to say, not only their downstream part but also their upstream part upstream of the front frame),
for each de-icing groove, an opening is provided at the bottom of the groove in the upstream part thereof (preferably at its upstream end) for the de-icing groove to communicate with the duct with D-shaped section.

In this second version of the invention, the foil forms the visible face of the inner duct of the air inlet. It covers the de-icing grooves to form hermetic channels for the circulation of hot air.

In a preferred version of the second version of the invention, the lip also comprises acoustic grooves as previously defined, and these acoustic grooves are formed on the inner face of the lip, alternating with the de-icing grooves (which are located on the other face).

According to one possible feature of the invention, the de-icing grooves are rectilinear and extend in longitudinal planes. Preferably, they have a width of between 3 and 25 mm.

According to one possible feature of the invention, the acoustic grooves are rectilinear and extend in longitudinal planes. Preferably, they have a width of between 3 and 25 mm.

According to one possible feature of the invention, each sound absorption hole of the foil is formed in line with a sound absorption hole of the lip, and vice versa.

In practice, the foil and the lip are assembled before being pierced; they are fixed together for example by rivets or other fixings along the transverse edges of the foil and by laser welds along the longitudinal edges of the de-icing grooves, then they are perforated together in the zones provided to receive the sound absorption holes, for example by waterjet or laser. The acoustic panels can then be incorporated in the lip.

According to one possible feature of the invention, the sound absorption holes have a diameter of between 0.5 mm and 1 mm.

BRIEF DESCRIPTION OF THE DRAWINGS

Other details and advantages of the present invention will become apparent on reading the following description, which refers to the attached schematic drawings and relates to preferential embodiments, provided as nonlimiting examples. In these drawings.

It should be noted that, for reasons of clarity, the ratio between the different dimensions of the elements represented was not able to be observed. In particular, the thickness of the various elements represented (lip, acoustic panel, etc.) is highly exaggerated relative to the other dimensions of these elements; likewise, the proportion between the diameter of the sound absorption holes and the perforated wall thickness is not observed for the transverse cross sections.

DETAILED DESCRIPTION OF THE PREFERRED EMBODIMENTS

Figure 1:
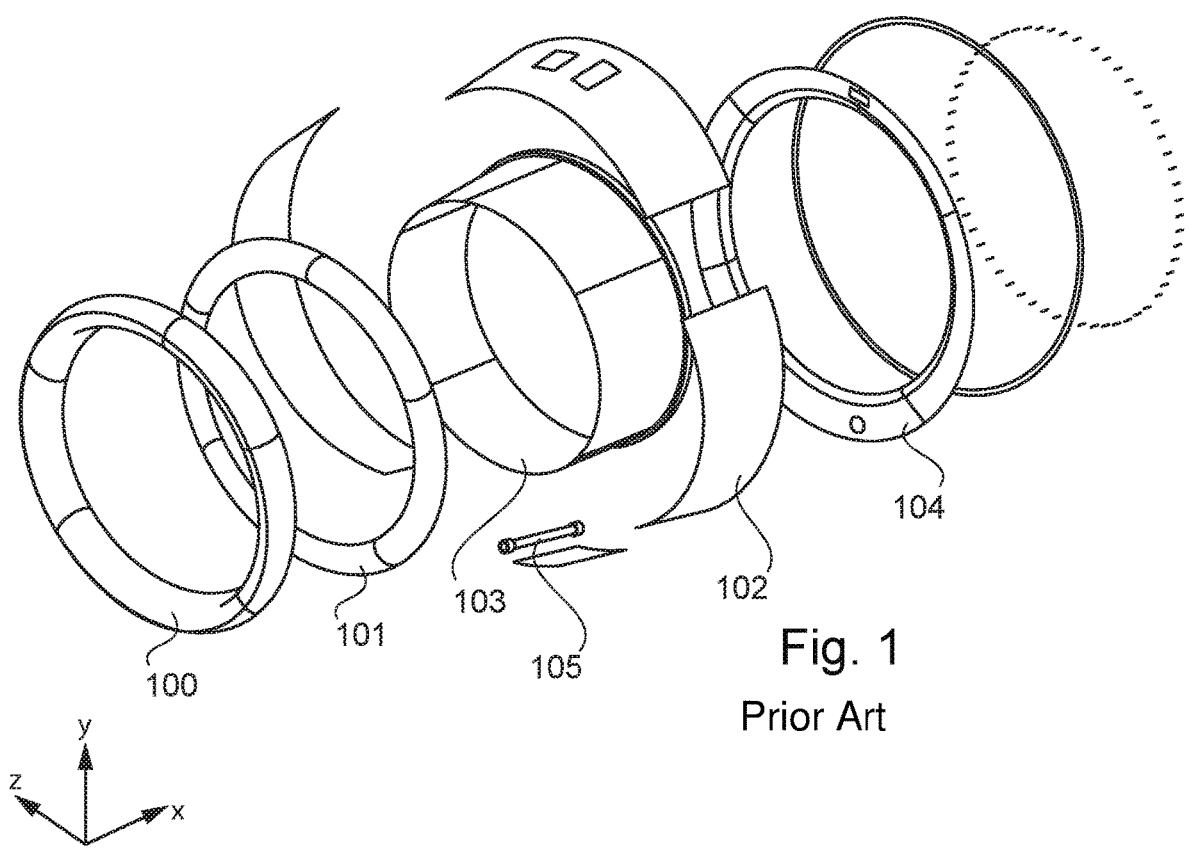
FIG. 1 is a perspective exploded view of an air inlet of the prior art. This air inlet is described in the introduction.
Figure 2:
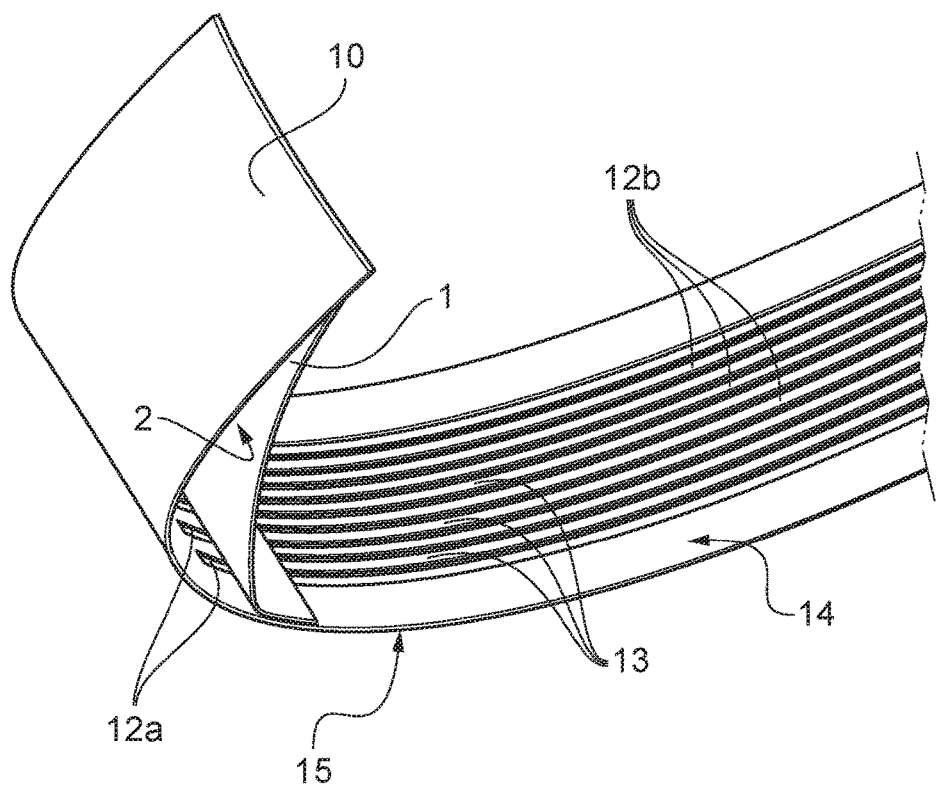
FIG. 2 is a perspective schematic view of an air inlet according to the first version of the invention, in which the acoustic panels and the foil have been removed.
Figure 3:
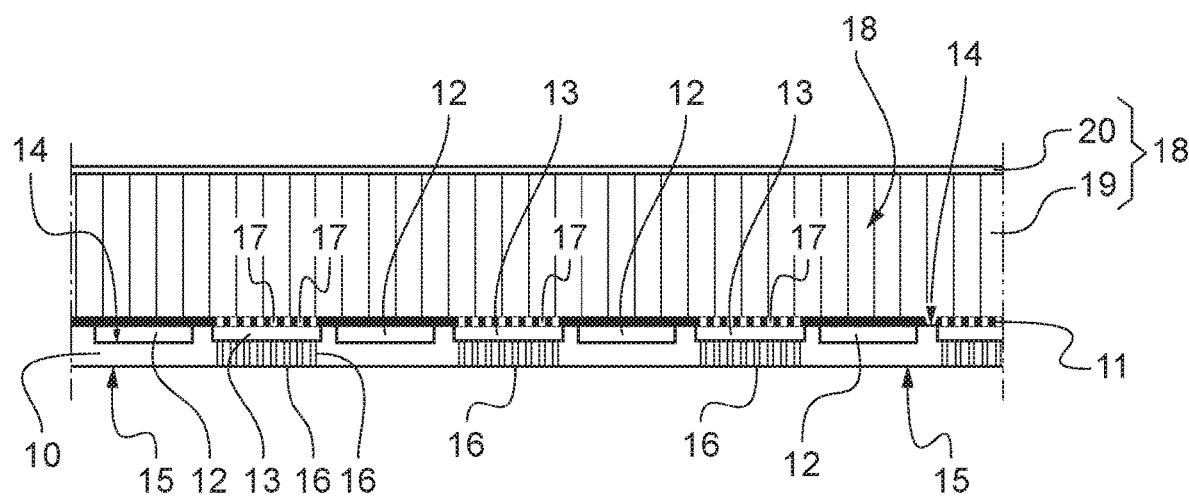
FIG. 3 is a schematic view in cross section through a transverse plane, of a portion of the air inlet of FIG. 2.

FIGS. 2 and 3 show elements of an air inlet according to the invention. Particularly visible therein are a sector of a frame 1 and a sector of a lip 10 according to the first embodiment of the invention. The lip sector forms, with the frame sector, a sector of a duct with D-shaped section 2.

The lip 10 is provided, on its inner face 14, with de-icing grooves 12 and with acoustic grooves 13. On the inner face 14 of the lip there therefore appears a succession (in the transverse direction) of longitudinal rectilinear trenches and of longitudinal rectilinear crenulations, the trenches alternating with the de-icing grooves 12 and the acoustic grooves 13. Opposite, the outer face 15 of the lip 10 is smooth (without grooves), but it has perforated zones passed through by sound absorption holes 16. These sound absorption holes 16 are formed only in the acoustic grooves 13. It is worth noting in FIG. 2 that the acoustic grooves 13 extend only downstream of the front frame 1, whereas the de-icing grooves 12 have a downstream part 12b downstream of the front frame 1 and an upstream part 12a upstream of the front frame 1.

The air inlet also comprises a foil 11 (not represented in FIG. 2—in order to leave the grooved inner face 14 visible—but represented in FIG. 3) pressed onto the inner face 14 of the lip 10, which foil 11 entirely covers the downstream part 12b of the de-icing grooves. The foil also covers the acoustic grooves 13, but it is pierced, facing these acoustic grooves 13, with sound absorption holes 17. Preferably, each sound absorption hole 16 of the lip 10 has a corresponding sound absorption hole 17 of the foil aligned with the sound absorption hole 16, and vice versa.

This results from a preferred manufacturing method used here, in which: a lip with a crenulated inner face is formed; a solid foil (and one whose two faces are smooth) is welded to the inner face of the lip, at the crenulations thereof (over all the length—and preferably also all the width—of the crenulations) for example by means of a laser, in order to obtain hermetic weld lines; the de-icing grooves 12 and the foil 11 then form, downstream of the frame 1 only, hermetic channels in which hot air can circulate without risking damaging the acoustic panels 18 (described later); upstream of the frame 1, these channels are open in the duct with D-shaped section 2; sound absorption holes 16 and 17 are then pierced (together) in each acoustic groove 13 over all the length (and all the width) of the grooves, for example by means of a laser or a waterjet. The diameter of the sound absorption holes 16 and 17 is preferably of the order of 0.6 mm, which is made possible because they are produced at the bottom of the grooves 13, in the zones where the lip 10 has a lesser thickness, of the order of 0.5 mm, for example.

The lip also comprises acoustic panels 18 (not represented in FIG. 2 but visible in FIG. 3) comprising a honeycomb core 19 and a solid rear skin 20. These acoustic panels 18 are arranged downstream of the frame 1, facing the acoustic grooves so as to entirely cover the latter. Preferably, the acoustic grooves 13 extend from the front frame 1 to a downstream end of the lip 10; sound absorption holes 16 (and 17) and acoustic panels 18 are provided over all the length of the acoustic grooves 13. Depending on the position of the front frame in the lip, it is thus possible to acoustically treat up to 85% of the length of the air inlet (it being considered that the inner surface downstream of the lip is treated acoustically over all its length as in the state of the art).

The lip finally comprises one or more longitudinal pipes (not represented), or any other appropriate means, for bringing hot air from the engine into the duct with D-shaped section 2. This hot air circulates also, from the duct with D-shaped section 2, in the de-icing grooves 12 (since the upstream part 12a of these grooves is not closed), which makes it possible to de-ice the lip 10 not only at the duct 2 but also downstream of the front frame 1, and do so as far as the downstream end of the lip if the de-icing grooves extend to that end.

Figure 4:
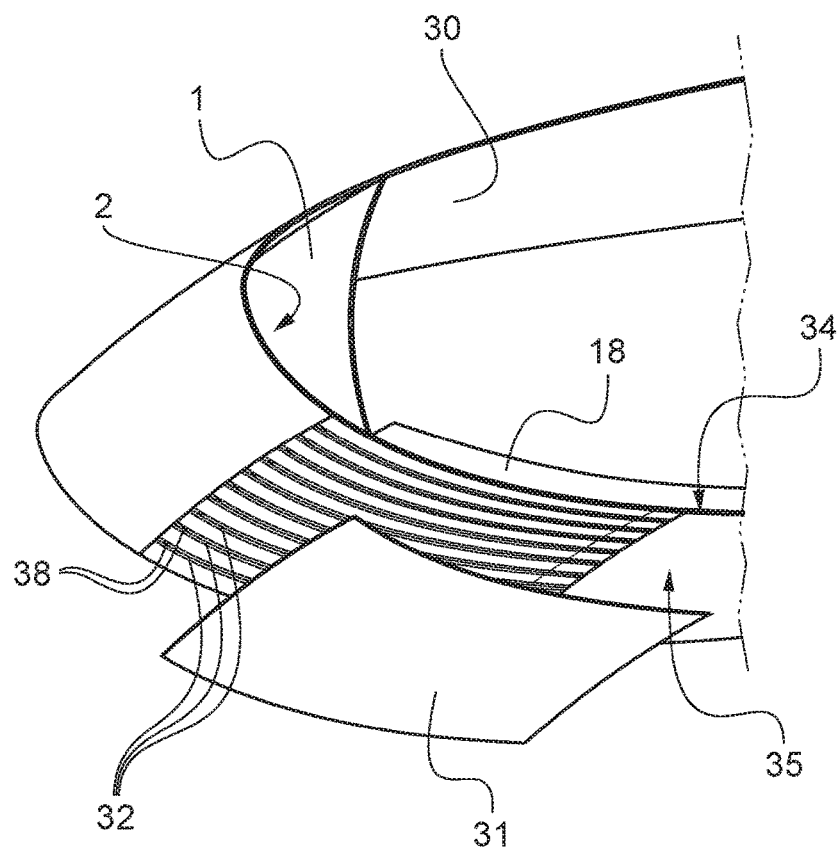
FIG. 4 is a perspective schematic view of an air inlet according to the second version of the invention, partly exploded.
Figure 5:
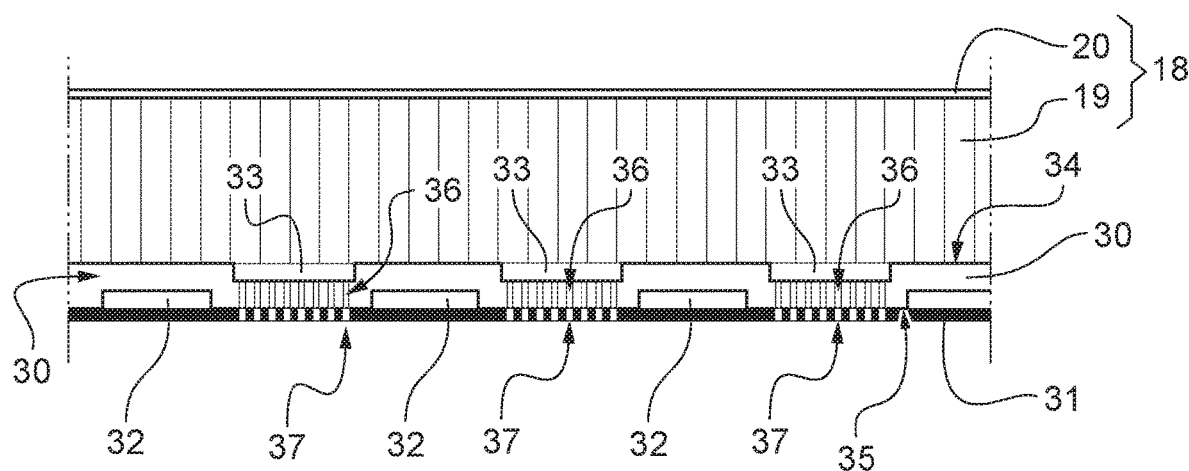
FIG. 5 is a schematic view in cross section through a transverse plane, of a portion of the air inlet of FIG. 4.
Figure 6:
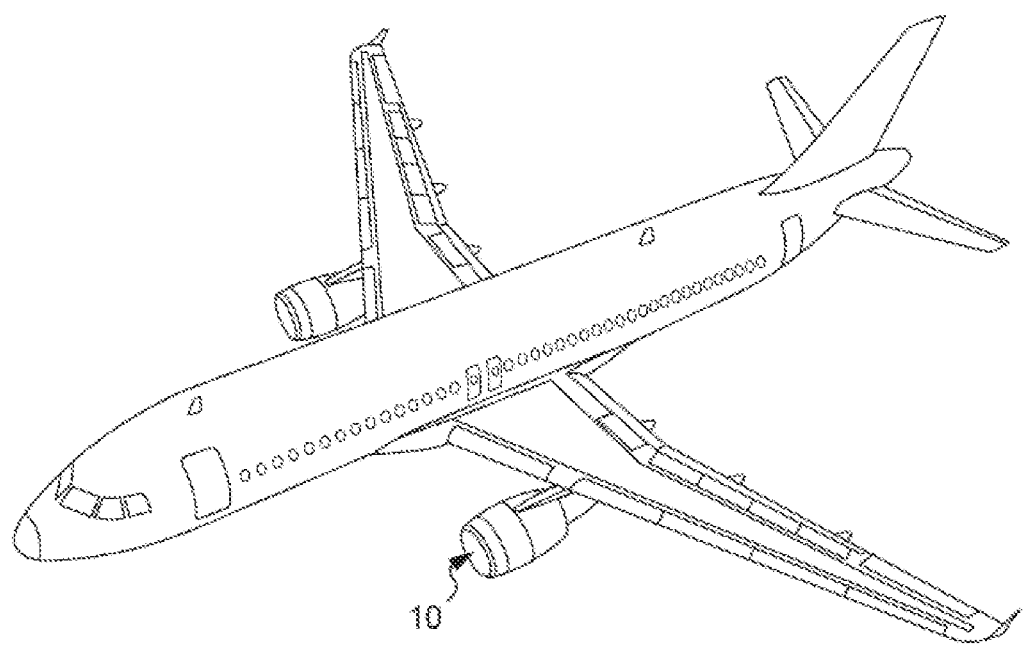
FIG. 6 is a perspective schematic view of an aircraft, each nacelle of which has an air inlet according to the invention.

FIGS. 4 and 5 show elements of another air inlet according to the invention. Visible therein are, in particular, a front frame sector 1 similar to that previously described, and a sector of a lip 30 according to the second embodiment of the invention. As for the first embodiment, the lip 30 forms, with the front frame 1, a duct with D-shaped section 2. The lip 30 has an inner face 34 and an outer face 35, both grooved downstream of the front frame 1.

The inner face 34 comprises acoustic grooves 33, which extend only downstream of the front frame 1, preferably from the front frame 1 to a downstream end of the lip 30. Although that does not seem to offer any benefit, the acoustic grooves could, however, be shorter, on the side of the front frame and/or on the side of the downstream end of the lip 30. The acoustic grooves 33 must not communicate with the duct with D-shaped section 2. This is why they extend only downstream of the front frame 1. The bottom of the acoustic grooves 33 is pierced with sound absorption holes 36 similar to the sound absorption holes 16 previously described.

The outer face 35 of the lip 30 comprises de-icing grooves 32 which have an upstream part upstream of the front frame 1 and a downstream part downstream of the front frame 1. Preferably, the downstream part of the de-icing grooves 32 extends longitudinally from the front frame 1 to the downstream end of the lip 30. This downstream part could, however, be shorter (that is to say, not extend to the downstream end of the lip 30). It is not necessary for the upstream part of the de-icing grooves to be very long since the lip is de-iced upstream of the front frame by the hot air which circulates in the duct with D-shaped section 2. The upstream part of each de-icing groove 32 must simply have a sufficient length for an opening 38 to be formed in this part for the purposes of communication between the de-icing groove 32 and the duct with D-shaped section 2.

The air inlet also comprises a foil 31, which is represented away from the lip 30 in FIG. 4 in order to reveal the outer face 35 of the lip. As can be observed in FIG. 5, the foil is, in reality, pressed against the outer face 35 of the lip 30, so as to cover and hermetically and fully seal the de-icing grooves 32. Facing the acoustic grooves 33, the foil is pierced with sound absorption holes 37 (which, given the scale, are not represented in FIG. 4 but are visible in FIG. 5). On each side of the de-icing grooves 32, the foil 31 is not pierced over a sufficient width to guarantee the hermetic sealing of the de-icing grooves. As for the first version of the invention, the foil 31 and the lip 30 are pierced after having been assembled, so that each sound absorption hole 36 of the lip has a corresponding sound absorption hole 37 of the foil aligned with the sound absorption hole 36 (and vice versa).

The lip also comprises acoustic panels 18 (represented both in FIG. 4 and in FIG. 5) comprising a honeycomb core 19 and a solid rear skin 20. These acoustic panels 18 are arranged downstream of the frame 1, facing the acoustic grooves so as to entirely cover the latter. The comments previously made concerning these acoustic panels with reference to the first version of the invention remain valid for this second version.

The invention extends to any variant accessible to a person skilled in the art, that is to say, falling with the scope delimited by the attached claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An air inlet for an aircraft nacelle, comprising:
   a front frame;
   a lip, which together with the front frame forms a duct with a D shaped section receiving hot air;
   the front frame is arranged in an advanced position inside the lip to form the duct with the D shaped section;
   the lip has de-icing grooves, each de-icing groove communicating with the duct with the D shaped section and having a downstream part extending downstream of the front frame;
   downstream of the front frame outside of the de-icing grooves, the lip has perforated zones provided with sound absorption holes;
   a foil, which covers and hermetically seals at least the downstream part of the de-icing grooves, the foil being provided with sound absorption holes facing the perforated zones and being solid facing the de-icing grooves; and
   acoustic panels inside the lip downstream of the front frame at least facing the perforated zones.

2. The air inlet according to claim 1, wherein each de-icing groove also has an upstream part extending upstream of the front frame and communicating with the duct with D shaped section.

3. The air inlet according to claim 2, wherein:
   the de-icing grooves are formed on an outer face of the lip;
   the foil is arranged outside the lip so as to cover all of the de-icing grooves; and
   for each de-icing groove, an opening is provided at the bottom of the groove in an upstream part thereof for the de-icing groove to communicate with the duct with the D shaped section.

4. The air inlet according to claim 1, wherein the lip also has acoustic grooves which incorporate the perforated zones of the lip, the sound absorption holes of the lips being formed at a bottom of the acoustic grooves.

5. The air inlet according to claim 4, wherein the acoustic grooves extend only downstream of the front frame.

6. The air inlet according to claim 4,
   wherein the de-icing grooves are formed on an inner face of the lip and the foil is arranged between the inner face of the lip and the acoustic panels, and
   wherein the acoustic grooves are formed on the inner face of the lip, alternating with the de-icing grooves.

7. The air inlet according to claim 4, wherein:
   the de-icing grooves are formed on an outer face of the lip;
   the foil is arranged outside the lip so as to cover all of the de-icing grooves;
   for each de-icing groove, an opening is provided at the bottom of the groove in an upstream part thereof for the de-icing groove to communicate with the duct with the D shaped section; and
   the acoustic grooves are formed on an inner face of the lip, alternating with the de-icing grooves.

8. The air inlet according to claim 4, wherein the acoustic grooves are rectilinear and extend in longitudinal planes.

9. The air inlet according to claim 1, wherein the de-icing grooves are formed on an inner face of the lip and the foil is arranged between the inner face of the lip and the acoustic panels.

10. The air inlet according to claim 1, wherein the foil extends only downstream of the front frame.

11. The air inlet according to claim 1, wherein the de-icing grooves are rectilinear and extend in longitudinal planes.

12. The air inlet according to claim 1, wherein each sound absorption hole of the foil is formed aligned with a sound absorption hole of the lip, and vice versa.

13. An aircraft nacelle, comprising the air inlet according to claim 1.

14. A propulsive assembly for an aircraft, comprising the air inlet according to claim 1.

15. An aircraft, comprising an air inlet according to claim 1.

* * * * *